United States Patent
Smith et al.

(10) Patent No.: US 12,291,324 B2
(45) Date of Patent: May 6, 2025

(54) REMOTE CONTROL SYSTEM FOR A MAGNUS-EFFECT AIRCRAFT

(71) Applicant: WIND FISHER, Les Adrets (FR)

(72) Inventors: Garrett Smith, Colomiers (FR); Armand Tardella, Merry-la-Vallée (FR)

(73) Assignee: WIND FISHER, Les Adrets (FR)

( * ) Notice: Subject to any disclaimer, the term of this patent is extended or adjusted under 35 U.S.C. 154(b) by 0 days.

(21) Appl. No.: 18/564,210

(22) PCT Filed: May 25, 2022

(86) PCT No.: PCT/EP2022/064342
§ 371 (c)(1),
(2) Date: Nov. 27, 2023

(87) PCT Pub. No.: WO2022/248631
PCT Pub. Date: Dec. 1, 2022

(65) Prior Publication Data
US 2024/0262494 A1 Aug. 8, 2024

(30) Foreign Application Priority Data

May 27, 2021 (FR) ...................................... 2105554

(51) Int. Cl.
| | |
|---|---|
| *B64C 23/08* | (2006.01) |
| *B64C 13/18* | (2006.01) |
| *B64C 39/02* | (2023.01) |
| *B64U 10/60* | (2023.01) |

(52) U.S. Cl.
CPC ............. *B64C 23/08* (2013.01); *B64C 13/18* (2013.01); *B64C 39/022* (2013.01); *B64U 10/60* (2023.01)

(58) Field of Classification Search
CPC ....... B64C 23/08; B64C 39/022; B64U 10/60; F05B 2240/201
See application file for complete search history.

(56) References Cited

U.S. PATENT DOCUMENTS 4,659,940 A * 4/1987 Shepard .................. F03D 13/20
416/85
6,072,245 A * 6/2000 Ockels ...................... F03D 9/25
290/55

(Continued)

FOREIGN PATENT DOCUMENTS

| DE | 102013205781 A1 | 10/2014 |
|---|---|---|
| FR | 3043386 A1 | 5/2017 |

(Continued)

OTHER PUBLICATIONS

International Search Report for International Application No. PCT/EP2022/064342, mailed Aug. 23, 2022, 7 pages with English translation.

(Continued)

*Primary Examiner* — Michael H Wang
(74) *Attorney, Agent, or Firm* — TraskBritt (57) ABSTRACT

A remote control system for an aircraft includes an aircraft of the Magnus-effect type. The aircraft includes a cylinder extending along a longitudinal axis. The cylinder is able to rotate about the longitudinal axis. A pair of rotatable elements are arranged at a distance from the aircraft. A drive means is designed to drive a rotational movement of the pair of rotatable elements. A connection cable is arranged to connect the pair of rotatable elements to the cylinder of the aircraft in such a way that the rotational movement of the pair of rotatable elements, driven by the drive means, is mechanically transmitted to the cylinder of the aircraft so as to cause the cylinder to rotate about the longitudinal axis.

15 Claims, 8 Drawing Sheets

(56) References Cited

U.S. PATENT DOCUMENTS

| | | | | |
|---|---|---|---|---|
| 6,523,781 | B2* | 2/2003 | Ragner | B64C 31/06 244/33 |
| 7,602,077 | B2* | 10/2009 | Ferguson | F03D 3/062 290/55 |
| 2007/0126241 | A1* | 6/2007 | Olson | F03D 5/04 290/55 |
| 2008/0181773 | A1* | 7/2008 | Ferguson | F03D 3/062 416/9 |
| 2008/0296905 | A1 | 12/2008 | Ferguson | |
| 2009/0278353 | A1* | 11/2009 | Da Costa Duarte Pardal | F03D 15/10 290/55 |
| 2014/0001308 | A1* | 1/2014 | Costa Duarte Pardal | B64B 1/02 244/29 |

FOREIGN PATENT DOCUMENTS

| | | |
|---|---|---|
| WO | 2007/139412 A1 | 12/2007 |
| WO | 2012/125052 A2 | 9/2012 |

OTHER PUBLICATIONS

International Written Opinion for International Application No. PCT/EP2022/064342, mailed Aug. 23, 2022, 9 pages with English machine translation.

\* cited by examiner

REMOTE CONTROL SYSTEM FOR A MAGNUS-EFFECT AIRCRAFT

CROSS-REFERENCE TO RELATED APPLICATIONS

This application is a national phase entry under 35 U.S.C. § 371 of International Patent Application PCT/EP2022/064342, filed May 25, 2022, designating the United States of America and published as International Patent Publication WO 2022/248631 A1 on Dec. 1, 2022, which claims benefit, under Article 8 of the Patent Cooperation Treaty, of French Patent Application Serial No. FR2105554, filed May 27, 2021.

TECHNICAL FIELD

The disclosure relates to the technical field of systems for controlling an aircraft of the Magnus-effect type.
The disclosure is notably applicable for:
producing electrical energy; and
carrying a payload, for example, for telecommunications or monitoring.

BACKGROUND

The operation of a Magnus-effect aircraft is known to a person skilled in the art, and is notably described in the book by R. Schmehl et al., entitled, "*Airborne Wind Energy: Advances in Technology Development and Research*," Springer, page 280 and page 304.

A system for controlling a Magnus-effect aircraft, known from the prior art, comprises:
an aircraft, of the Magnus-effect type, comprising a cylinder extending along a longitudinal axis, with the cylinder being able to rotate about the longitudinal axis;
an electric motor, arranged on the aircraft in order to cause the cylinder to rotate about the longitudinal axis;
a winch, comprising a drum that is able to rotate;
a connection cable, arranged to connect the aircraft to the winch so that a lift movement of the aircraft can be mechanically transmitted to the winch, with the connection cable being a power supply cable arranged to electrically power the motor; and
an electric generator, arranged to convert a rotation of the drum of the winch, obtained by mechanical transmission of the lift movement of the aircraft, into electrical energy.

Such a system of the prior art is not entirely satisfactory insofar as the motor for driving the cylinder, on board the aircraft, must be electrically powered by the connection cable in order to overcome a problem of autonomy. This results in limitations in terms of the selection of a connection cable that must be electrically conductive. However, the bindings on the electrical connection cables are highly stressed and therefore are likely to degrade and risk disintegrating.

BRIEF SUMMARY

Embodiments of the disclosure aim to address all or some of the aforementioned disadvantages. To this end, the subject matter of the disclosure is a remote control system for an aircraft, comprising:
an aircraft, of the Magnus-effect type, comprising a cylinder extending along a longitudinal axis, the cylinder being able to rotate about the longitudinal axis;
a rotatable element, arranged at a distance from the aircraft;
drive means, arranged to drive a rotational movement of the rotatable element; and
a connection cable, arranged to connect the rotatable element to the cylinder of the aircraft so that the rotational movement of the rotatable element, driven by the drive means, is mechanically transmitted to the cylinder of the aircraft so as to set the cylinder into rotation about the longitudinal axis.

Thus, such a system according to embodiments of the disclosure dispenses with an electric motor on board the aircraft for setting the cylinder into rotation about the longitudinal axis (i.e., the pitch axis of the aircraft). Indeed, according to embodiments of the disclosure, the cylinder is set into rotation about the longitudinal axis by a mechanical transfer with the rotatable element via the connection cable, which allows energy conversion losses to be reduced compared to the prior art. The selection of the connection cable is not limited, the connection cable does not have to be electrically conductive, unlike the prior art, which overcomes the problem of the potential degradation of the bindings.

The rotational drive of the cylinder about the longitudinal axis is thus offset, for example, within a terrestrial or maritime station where the rotatable element and the means for driving the rotatable element can be arranged, which allows the aircraft to be lighter.

The system according to embodiments of the disclosure can comprise one or more of the following features.

According to one feature of the disclosure, the connection cable is wound around the cylinder of the aircraft so that the rotational movement of the rotatable element, driven by the drive means, is mechanically transmitted to the cylinder of the aircraft by friction on the connection cable so as to set the cylinder into rotation about the longitudinal axis.

Thus, one advantage that is provided is to allow direct mechanical transfer between the connection cable and the cylinder of the aircraft in order to control the aircraft along the pitch axis by controlling the speed of rotation of the cylinder about the longitudinal axis.

According to one feature of the disclosure, the system comprises a transmission device arranged to mechanically cooperate with the connection cable and the cylinder of the aircraft so that the rotational movement of the rotatable element, driven by the drive means, is mechanically transmitted to the cylinder of the aircraft by the transmission device so as to set the cylinder into rotation about the longitudinal axis.

Thus, one advantage that is provided is to allow indirect mechanical transfer between the connection cable and the cylinder of the aircraft (by means of the transmission device) in order to control the aircraft along the pitch axis by controlling the speed of rotation of the cylinder about the longitudinal axis.

According to one feature of the disclosure, the transmission device comprises a configuration in which a mechanical transmission of the rotational movement of the rotatable element to the cylinder is interrupted, so that the cylinder is free to rotate about the longitudinal axis, with the transmission device preferably comprising a freewheel or a clutch.

Thus, one advantage that is provided by this configuration is to be able to rewind the connection cable without transmitting power to the cylinder of the aircraft when the mechanical transmission is interrupted.

According to one feature of the disclosure, the aircraft, in lift, is intended to be subjected to wind, with the system comprising control means configured to control the drive means as a function of the wind.

Thus, one advantage that is provided is to be able to control the torque and the speed of rotation of the rotatable element.

According to one feature of the disclosure, the aircraft comprises guide means, arranged to guide the connection cable between two positions relative to the cylinder defining a maximum roll angle.

Thus, one advantage that is provided is to facilitate piloting of the aircraft by controlling the roll angle of the aircraft. The guide means are arranged relative to the cylinder in order to maintain a movement of the connection cable along an axis parallel to the longitudinal axis of the cylinder between the two positions defining the maximum roll angle.

According to one feature of the disclosure, the cylinder has first and second longitudinal ends, with the system comprising first and/or second attachment cables, respectively fixed to the first and/or second longitudinal ends of the cylinder, and respectively connected to first and/or second winches.

Thus, one advantage that is provided is to be able to control the aircraft along the roll axis by controlling the length of the first and/or second attachment cables between the aircraft and the first and/or second winches, respectively.

According to one feature of the disclosure, the system comprises an anchoring zone, arranged at a distance from the aircraft, and the connection cable is fixed to the anchoring zone.

Thus, one advantage that is provided by the anchoring zone is to allow the torque on the cylinder to be controlled independently of the equilibrium between the aerodynamic forces and the sum of the tensions in the sections of the connection cable.

According to one feature of the disclosure, the system comprises a pair of rotatable elements, arranged at a distance from the aircraft, in which system:
  the drive means are arranged to drive a rotational movement of the pair of rotatable elements; and
  the connection cable is arranged to connect the pair of rotatable elements to the cylinder of the aircraft so that the rotational movement of the pair of rotatable elements, driven by the drive means, is mechanically transmitted to the cylinder of the aircraft so as to set the cylinder into rotation about the longitudinal axis.

Thus, one advantage that is provided by the pair of rotatable elements is to control the two directions of rotation of the cylinder of the aircraft about the longitudinal axis (the pitch axis), which avoids crossing portions of the connection cable. Controlling the length of the connection cable between the aircraft and the rotatable elements allows a reciprocating lift movement (back-and-forth) to be created for the aircraft. The pair of rotatable elements comprises first and second rotatable elements. The first and second rotatable elements can be independent in the sense that the first and second rotatable elements can have a different rotational speed (winding, unwinding, stopping).

According to one feature of the disclosure, the system comprises:
  an additional pair of rotatable elements, arranged at a distance from the aircraft; and
  an additional connection cable;
  in which system:
  the drive means are arranged to drive a rotational movement of the additional pair of rotatable elements; and
  the additional connection cable is arranged to connect the additional pair of rotatable elements to the cylinder of the aircraft so that the rotational movement of the additional pair of rotatable elements, driven by the drive means, is mechanically transmitted to the cylinder of the aircraft so as to set the cylinder into rotation about the longitudinal axis.

Thus, one advantage that is provided is to be able to transmit the desired power to the cylinder at any moment, including when rewinding the connection cable or the additional connection cable.

According to one feature of the disclosure:
  the aircraft comprises first and second cylinders respectively extending along first and second longitudinal axes, with the first and second cylinders being able to rotate about the first and second longitudinal axes, respectively;
  the connection cable is arranged to connect the pair of rotatable elements to the first cylinder of the aircraft so that the rotational movement of the pair of rotatable elements, driven by the drive means, is mechanically transmitted to the first cylinder of the aircraft so as to set the first cylinder into rotation about the first longitudinal axis; and
  the additional connection cable is arranged to connect the additional pair of rotatable elements to the second cylinder of the aircraft so that the rotational movement of the additional pair of rotatable elements, driven by the drive means, is mechanically transmitted to the second cylinder of the aircraft so as to set the second cylinder into rotation about the second longitudinal axis.

Thus, one advantage that is provided is to be able to control the aircraft along the yaw axis by introducing a differential of speeds of rotation between the pair of rotatable elements and the additional pair of rotatable elements. This results in differential drag that generates torque about the yaw axis of the aircraft. It is then possible to dispense with a tail device for stabilizing the aircraft along the yaw axis. It is also possible to contemplate dynamic flights with the possibility of maneuvering the aircraft around the yaw axis by making figure-eight (figure-8) shaped trajectories at a given altitude in order to make return trips. The term "dynamic flight" is understood to mean a flight during which the aircraft is constantly moving and continuously adapts to the characteristics of the wind.

According to one feature of the disclosure, the system comprises first and second assemblies, each comprising:
  two pairs of rotatable elements arranged at a distance from the aircraft; and
  two connection cables;
  in which system:
  the aircraft comprises first and second cylinders respectively extending along first and second longitudinal axes, with the first and second cylinders being able to rotate about the first and second longitudinal axes, respectively;
  the drive means are arranged to drive a rotational movement of the rotatable elements of the first and second assemblies;
  each connection cable of the first assembly is arranged to connect a pair of rotatable elements of the first assembly to the first cylinder of the aircraft so that the rotational movement of the rotatable elements of the first assembly, driven by the drive means, is mechanically transmitted to the first cylinder of the aircraft so as to set the first cylinder into rotation about the first longitudinal axis; and each connection cable of the second assembly is arranged to connect a pair of rotatable elements of the second assembly to the second cylinder of the aircraft so that the rotational movement of the rotatable elements of the second assembly, driven by the drive means, is mechanically transmitted to the second cylinder of the aircraft so as to set the second cylinder into rotation about the second longitudinal axis.

Thus, one advantage that is provided is to be able to transmit the desired power to the corresponding cylinder at any moment, including when rewinding one of the two connection cables of the corresponding assembly.

According to one feature of the disclosure, the aircraft, in lift, has a yaw axis and is intended to be subjected to wind, the system comprising an elbow element having:

a first branch, connected to the first cylinder; and a second branch, connected to the second cylinder;

with the first and second branches forming a sweep angle adapted to stabilize the aircraft along the yaw axis as a function of the wind.

According to one feature of the disclosure, the rotatable element is a drum of a winch.

Thus, one advantage that is provided by a winch is to be able to control both:

the length of the connection cable extending between the drum and the aircraft; and the speed of rotation of the drum.

According to one feature of the disclosure, the connection cable is arranged to connect the aircraft to the rotatable element so that a lift movement of the aircraft can be mechanically transmitted to the rotatable element.

According to one feature of the disclosure, the system comprises a converter, arranged to convert a rotation of the rotatable element, obtained by a mechanical transmission of the lift movement of the aircraft, into energy.

Thus, one advantage that is provided is to be able to recover the mechanical energy resulting from the lift movement of the aircraft.

According to one feature of the disclosure, the aircraft, in lift, has a yaw axis, and is intended to be subjected to wind, with the system comprising a tail device, arranged to stabilize the aircraft along the yaw axis as a function of the wind.

BRIEF DESCRIPTION OF THE DRAWINGS

Further features and advantages will become apparent from the detailed disclosure of various embodiments of the disclosure, with the disclosure being accompanied by examples and references to the attached drawings.

It should be noted that the drawings described above are schematic, and are not necessarily to scale for the sake of legibility and so that they can be easily understood.

DETAILED DESCRIPTION

Elements that are identical or that provide the same function will use the same reference signs for the various embodiments, for the sake of simplification.

An aim of embodiments of the disclosure is a remote control system for an aircraft, comprising:

an aircraft, of the Magnus-effect type, comprising a cylinder 1 extending along a longitudinal axis Y, the cylinder 1 being able to rotate about the longitudinal axis Y;

a rotatable element 2, arranged at a distance from the aircraft;

drive means 3, arranged to drive a rotational movement of the rotatable element 2; and a connection cable 4, arranged to connect the rotatable element 2 to the cylinder 1 of the aircraft so that the rotational movement of the rotatable element 2, driven by the drive means 3, is mechanically transmitted to the cylinder 1 of the aircraft so as to set the cylinder 1 into rotation about the longitudinal axis Y.

Aircraft

The cylinder 1 forms a wing of the aircraft. Setting the cylinder 1 into rotation about the longitudinal axis Y allows the Magnus-effect to be used in order to increase the lift of the aircraft. The cylinder 1 has first and second longitudinal ends 10, 11 (illustrated in FIG. 8). The aircraft advantageously comprises first and second disks 100, 110, respectively mounted on the first and second longitudinal ends 10, 11 of the cylinder 1 so as to improve the aerodynamic performance of the aircraft. The first and second disks 100, 110 are advantageously detachably mounted on the first and second longitudinal ends 10, 11 of the cylinder 1 in order to disengage from the cylinder 1 so as to provide a landing gear function. The first and second disks 100, 110 are advantageously free to rotate relative to the cylinder 1 when the aircraft is on the ground. In flight, the first and second disks 100, 110 are rotationally integral with the cylinder 1.

The cylinder 1 advantageously has a circular cross-section, with a diameter denoted D. The cylinder 1 advantageously has a length, denoted L, along the longitudinal axis Y, establishing an L-D ratio ranging between 6 and 12.

Figure 8:
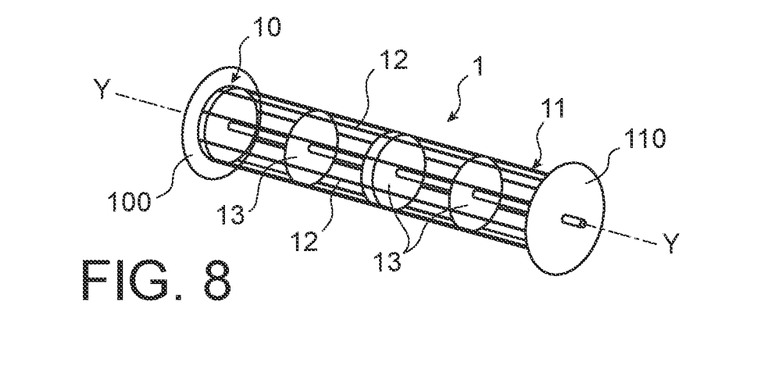
FIG. 8 is a schematic perspective and transparent view of an embodiment of a cylinder of an aircraft belonging to a system according to the disclosure.

The cylinder 1 is advantageously filled with a gas with a mass density lower than the air density, so as to create Archimedean lift. The mass of the aircraft is then less than the mass of the air so that the aircraft is an aerostat. The gas can be hydrogen or helium. The gas can be pressurized, for example, between 20 mbar and 50 mbar, depending on the dimensions of the cylinder 1, so that the pressure of the gas inside the cylinder 1 is greater than the atmospheric pressure. The cylinder 1 can be produced in the form of a balloon. The cylinder 1 can comprise a casing made of a gas-tight textile material. The pressurized gas stiffens the cylinder 1. The cylinder 1 is advantageously provided with reinforcing members 12, which can be produced in the form of longitudinal rods extending along an axis parallel to the longitudinal axis Y of the cylinder 1, in order to improve the mechanical strength of the cylinder 1. As illustrated in FIG. 8, the cylinder 1 can comprise internal elements 13, for example, produced in the form of disks, arranged to reinforce the mechanical strength of the cylinder 1. The internal elements 13 also can be arranged to form compartments inside the cylinder 1, for example, for a pressurization gas.

The aircraft advantageously comprises a dynamo-electric machine, arranged to convert mechanical energy (rotation of the cylinder 1 about the longitudinal axis Y) into electrical energy. The electrical energy generated by the dynamo-electric machine can electrically power components of the aircraft, such as sensors, on-board computers, de-icing devices, devices for maintaining the pressure of the gas inside the cylinder 1, etc. It is also possible to use other types of machines that allow the mechanical energy of the rotation of the cylinder 1 about the longitudinal axis Y to be converted (for example, conversion to heat for de-icing).

The aircraft is advantageously equipped with means for acquiring the characteristics of the wind blowing on the cylinder 1, such as an anemometer, configured to send data representing the characteristics of the wind V to processing/control means, such as a microcontroller. The processing/control means can be on-board the aircraft. The aircraft is advantageously equipped with means for acquiring parameters specific to the cylinder 1, such as an inertial unit configured to transmit data to the processing/control means that represents the orientation of the cylinder relative to the wind V, the speed of the cylinder 1, the acceleration of the cylinder 1, etc.

The aircraft can comprise first and second cylinders 1, 1', respectively extending along first and second longitudinal axes Y, Y', with the first and second cylinders 1, 1' being able to rotate about the first and second longitudinal axes Y, Y', respectively.

The aircraft comprises a support structure 5, arranged to support the cylinder 1. The cylinder 1 is mounted so as to be able to rotate on the support structure 5 about the longitudinal axis Y. The support structure 5 can comprise a set of branches forming a frame for the cylinder. The support structure can comprise two longitudinal branches 50, each extending along a first axis parallel to the longitudinal axis Y of the cylinder 1. The support structure 5 can comprise two lateral branches 51, each extending along a second axis perpendicular to the first axis, and connected to the longitudinal branches 50. The cylinder 1 can be mounted so as to be able to rotate about the longitudinal axis Y on the lateral branches 51 of the support structure 5, for example, by virtue of mechanical axes 510 and mechanical bearings 511 (notably illustrated in FIG. 7).

Figure 7:
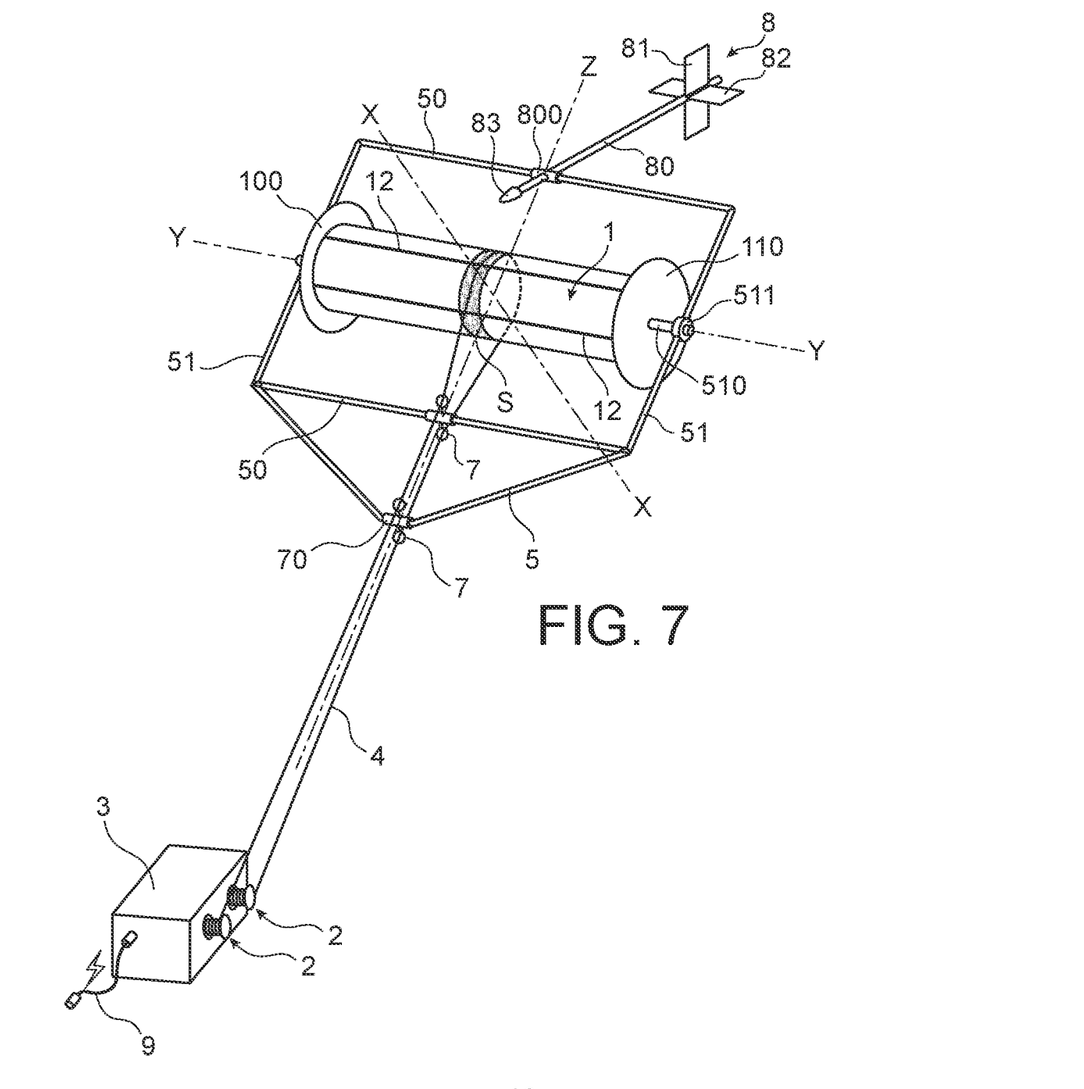
FIG. 7 is a schematic perspective view of the first main embodiment of a system according to the disclosure illustrated in FIG. 6.

The aircraft, in lift, has a yaw axis Z and is intended to be subjected to wind V. By convention, the longitudinal axis Y along which the cylinder 1 extends is the pitch axis. The yaw axis Z and the roll axis X are perpendicular to each other, and extend in a plane perpendicular to the longitudinal axis Y (i.e., the pitch axis). When the pitch axis Y is horizontal, the yaw axis Z is vertical and the roll axis X is horizontal. The pitch axis Y, the yaw axis Z and the roll axis X are perpendicular to each other, as illustrated in FIG. 7.

Figure 10:
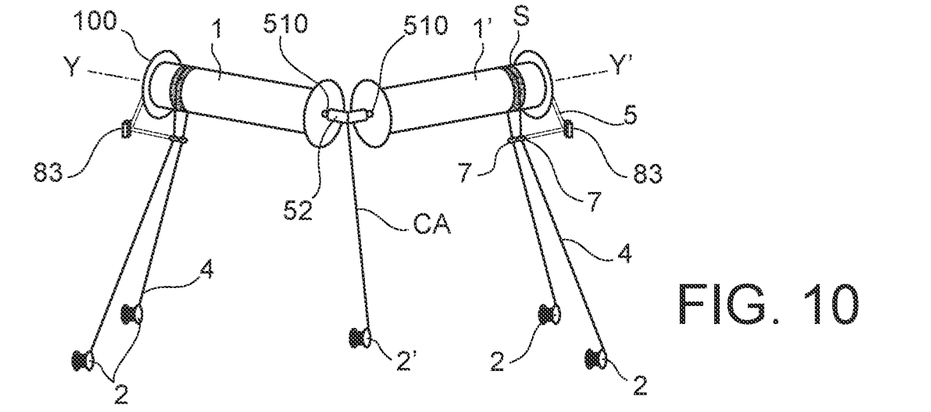
FIG. 10 is a schematic perspective view of a system according to embodiments of the disclosure, notably illustrating a sweep angle between the two cylinders.
Figure 11:
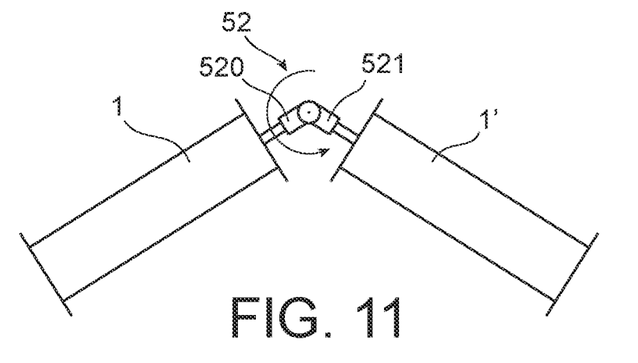
FIG. 11 is a partial schematic top view of a system according to embodiments of the disclosure, notably illustrating an elbow element connecting the two cylinders.

The system advantageously comprises an elbow element 52 (illustrated in FIGS. 10 and 11) having:

a first branch 520, connected to the first cylinder 1; and a second branch 521, connected to the second cylinder 1';

with the first and second branches 520, 521 forming a sweep angle adapted to stabilize the aircraft along the yaw axis Z as a function of the wind V.

According to an alternative embodiment, the system comprises a straight connection element 53 (illustrated in FIGS. 9 and 15) arranged to connect the first and second cylinders 1, 1'.

The aircraft can comprise propellers (not shown), arranged on the support structure 5 to facilitate the take-off and landing of the aircraft.

Rotatable Element(s)

The rotatable element 2 is advantageously a drum of a winch, which allows a rotational movement of the drum to be converted into a linear movement of the connection cable 4, and vice versa. By way of an example, the linear speed of the connection cable 4 can range between 0 $m \cdot s^{-1}$ and 40 $m \cdot s^{-1}$. The connection cable 4 is advantageously wound around the drum of the winch.

Figure 2:
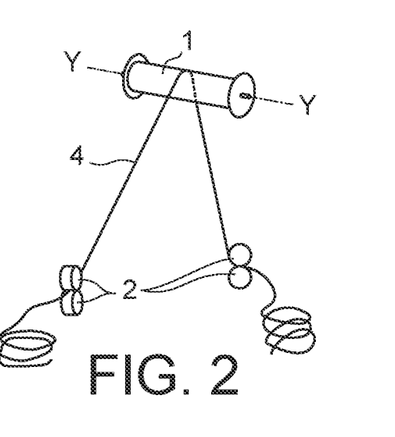
FIG. 2 is a schematic perspective view of a system according to embodiments of the disclosure, notably illustrating the presence of a plurality of rotatable elements produced in the form of return pulleys.

According to an alternative embodiment illustrated in FIG. 2, the system can comprise two pairs of rotatable elements 2, with each rotatable element 2 being produced in the form of a return pulley. Each pair of rotatable elements 2 is arranged to clamp the connection cable 4.

Figure 4A:
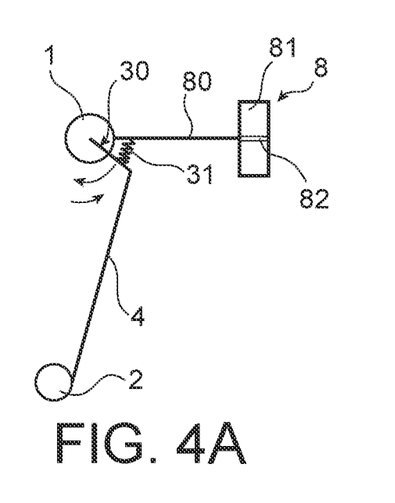
FIG. 4A is a schematic perspective view of a system according to embodiments of the disclosure, notably illustrating the presence of a transmission shaft (with stabilizer) setting a rotatable element into rotation, with the transmission shaft being mounted on the rotatable element against the action of resilient return means.

According to an alternative embodiment illustrated in FIG. 4A, the cylinder 1 can be provided with a transmission shaft 30 setting the cylinder 1 into rotation by means of pulses, with the transmission shaft 30 being mounted on the aircraft against the action of resilient return means 31, for example, a spring. The connection cable 4 connects the transmission shaft 30 to the rotatable element 2. The rotatable element 2 sends pulses to the connection cable 4, which pulls on the transmission shaft 30 and sets the cylinder 1 into rotation about the longitudinal axis Y. The aircraft is advantageously provided with a horizontal stabilizer 82 (see the "tail device" paragraph) arranged to compensate for the torque created by the resilient return means 31.

Drive Means

Figure 3:
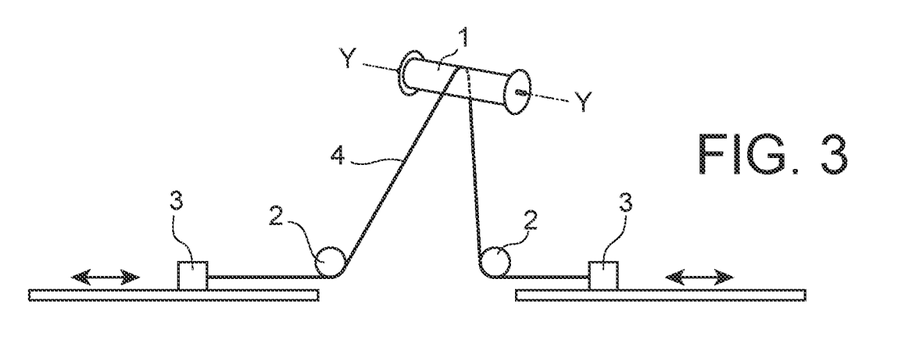
FIG. 3 is a schematic perspective view of a system according to embodiments of the disclosure, notably illustrating the presence of linear motors that indirectly drive a rotational movement of the rotatable elements.

The drive means 3 can comprise a motor, preferably an electric motor, arranged to drive a rotational movement of the rotatable element 2. The drive means 3 can directly or indirectly drive the rotatable element 2. An example of indirect drive is illustrated in FIG. 3, where linear motors of drive means 3 pull the connection cable 4 and thereby set the rotatable elements 2 into rotation. When the system comprises a pair of rotatable elements 2 (first and second rotatable elements 2) arranged at a distance from the aircraft, the drive means are arranged to drive a rotational movement of the pair of rotatable elements 2. In other words, the drive means are arranged to drive the first and/or second rotatable element 2 of the pair. The first and second rotatable elements can be independent in the sense that the first and second rotatable elements can have a different rotational speed (winding, unwinding, stopping). In other words, it is possible to introduce a differential of speeds of rotation between the first and second rotatable elements 2 of the pair.

The aircraft, in lift, is intended to be subjected to wind V. The system advantageously comprises control means, configured to control the drive means as a function of the wind V. Thus, it is possible to vary the lift of the aircraft, and therefore the altitude of the aircraft, by varying the speed of rotation of the rotatable element 2.

The control means can control the speed of rotation of the drum of the winch so that the tangential speed at a point of the cylinder 1 is greater than the speed of the wind V blowing in the vicinity of this point of the cylinder 1 (apparent wind).

Station

The system advantageously comprises a station, preferably terrestrial or maritime, in which the one or more rotatable elements 2 and the drive means 3 are arranged. The station can be fixed or movable relative to the terrestrial reference frame. The movable station can be produced in the form of a vehicle such as a submarine.

According to one embodiment, not illustrated, the system can comprise means for modifying the direction (for example, return pulleys) arranged to modify the direction of the connection cable 4 between the station and the aircraft. Thus, it is possible, for example, to prevent the connection cable 4 from being in contact with obstacles present on the ground.

The station and the aircraft are advantageously provided with communication means, preferably wireless communication means, so that communication can be established between the station and the aircraft.

Connection Cable(s)

The connection cable 4 can be made of a dielectric material. The connection cable 4 advantageously has high tensile strength. The connection cable 4 can be made of a polymer material, for example, high-density polyethylene. The connection cable 4 can comprise a gas duct, arranged to supply the cylinder 1 with pressurized gas.

Figure 1:
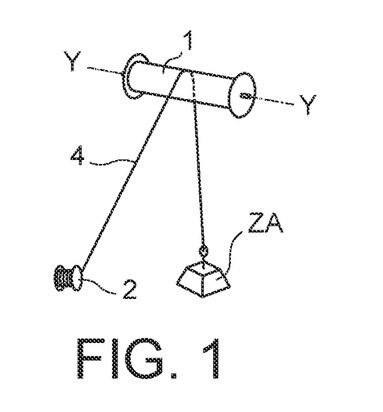
FIG. 1 is a schematic perspective view of a system according to embodiments of the disclosure, notably illustrating the presence of an anchoring zone, to which the connection cable is fixed.
Figure 12:
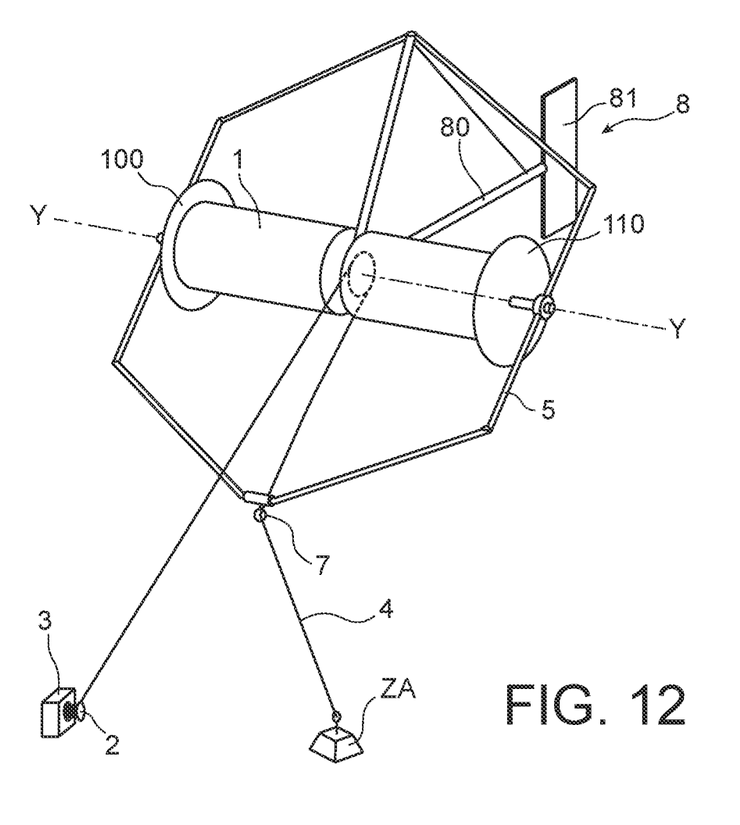
FIG. 12 is a schematic perspective view of a third main embodiment of a system according to the disclosure.

As illustrated in FIGS. 1 and 12, the system can comprise an anchoring zone ZA, arranged at a distance from the aircraft, and the connection cable 4 is fixed to the anchoring zone ZA.

Figure 4B:
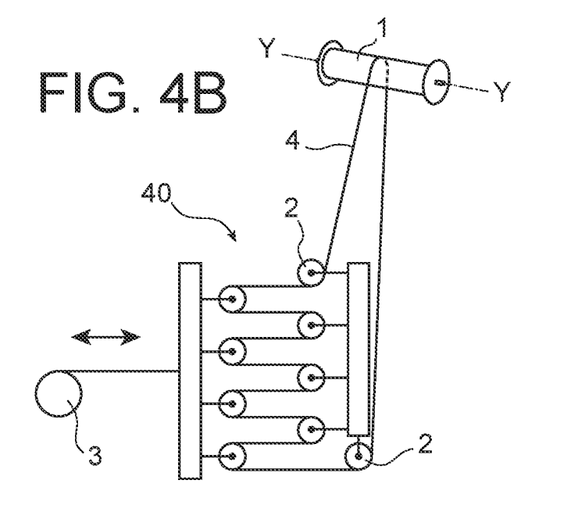
FIG. 4B is a schematic perspective view of a system according to embodiments of the disclosure, notably illustrating a reeving connected to the rotatable elements.

As illustrated in FIG. 4B, the connection cable 4 can be connected to a reeving 40 so as to form a continuous loop. The drive means 3 thus can be offset relative to the rotatable elements 2.

Figure 5:
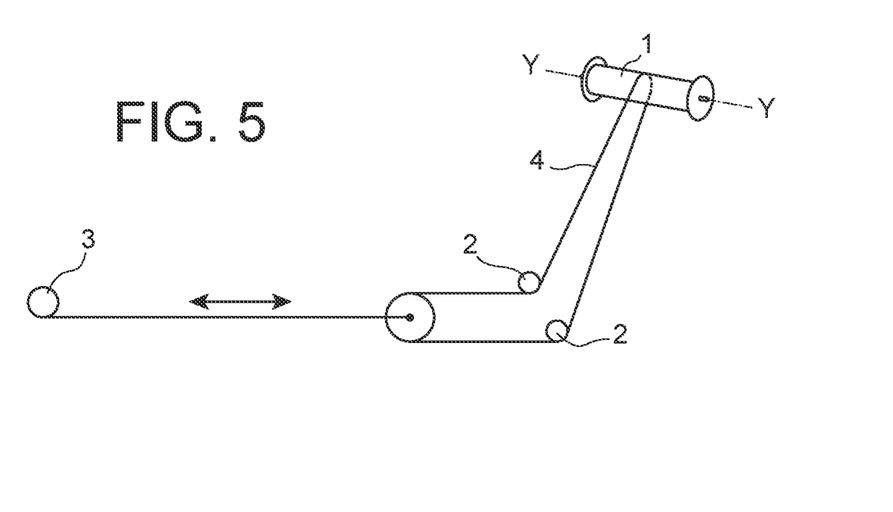
FIG. 5 is a schematic perspective view of a system according to embodiments of the disclosure, notably illustrating a connection cable forming a continuous loop.

According to an alternative embodiment illustrated in FIG. 5, the connection cable 4 can be connected to a set of rotatable elements 2 so as to form a continuous loop and the drive means 3 are offset relative to the rotatable elements 2. One of the two rotatable elements 2 illustrated in FIG. 5 can be rotationally blocked so as to allow a translation movement of the connection cable 4 in order to set the cylinder 1 into rotation about the longitudinal axis Y.

Transmission of the Rotational Movement of the Rotatable Element to the Cylinder According to one embodiment, the connection cable 4 is wound around the cylinder 1 of the aircraft so that the rotational movement of the rotatable element 2, driven by the drive means 3, is mechanically transmitted to the cylinder 1 of the aircraft by friction on the connection cable 4 so as to set the cylinder 1 into rotation about the longitudinal axis Y.

When the system comprises a pair of rotatable elements 2 arranged at a distance from the aircraft, the connection cable 4 is wound around the cylinder 1 of the aircraft so that the rotational movement of the pair of rotatable elements 2, driven by the drive means 3, is mechanically transmitted to the cylinder 1 of the aircraft by friction on the connection cable 4 so as to set the cylinder 1 into rotation about the longitudinal axis Y.

Figure 9:
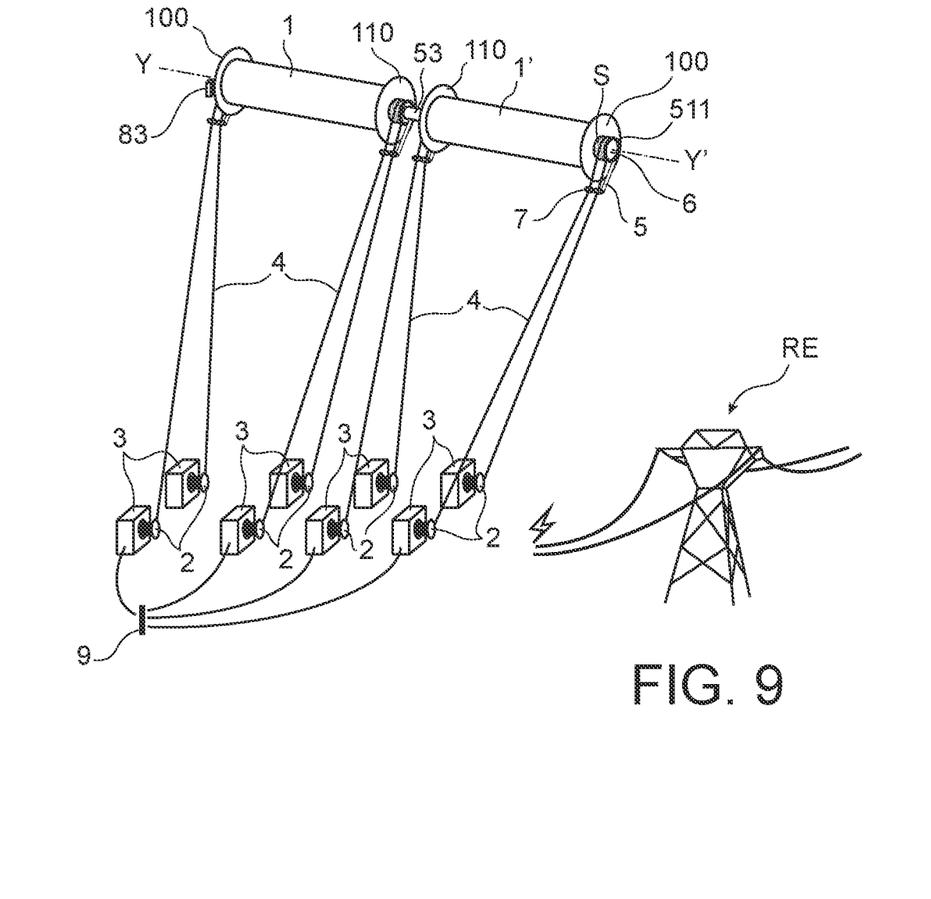
FIG. 9 is a schematic perspective view of a second main embodiment of a system according to the disclosure, notably illustrating the presence of two cylinders.

According to an alternative embodiment, the system comprises a transmission device 6 arranged to mechanically cooperate with the connection cable 4 and the cylinder 1 of the aircraft so that the rotational movement of the rotatable element 2, driven by the drive means 3, is mechanically transmitted to the cylinder 1 of the aircraft by the transmission device 6 so as to set the cylinder 1 into rotation about the longitudinal axis Y. The transmission device 6 advantageously comprises a configuration in which mechanical transmission of the rotational movement of the rotatable element 2 to the cylinder 1 is interrupted, so that the cylinder 1 is free to rotate about the longitudinal axis Y. The transmission device 6 preferably comprises a freewheel or a clutch. The transmission device 6 is advantageously mounted on the first and second longitudinal ends 10, 11 of the cylinder 1, as illustrated in FIG. 9.

When the system comprises a pair of rotatable elements 2 arranged at a distance from the aircraft, the transmission device 6 is arranged to mechanically cooperate with the connection cable 4 and the cylinder 1 of the aircraft so that the rotational movement of the pair of rotatable elements 2, driven by the drive means 3, is mechanically transmitted to the cylinder 1 of the aircraft by the transmission device 6 so as to set the cylinder 1 into rotation about the longitudinal axis Y. The transmission device 6 advantageously comprises a configuration in which mechanical transmission of the rotational movement of the pair of rotatable elements 2 to the cylinder 1 is interrupted, so that the cylinder 1 is free to rotate about the longitudinal axis Y.

Guide Means

The aircraft advantageously comprises guide means arranged to guide the connection cable 4 between two positions relative to the cylinder 1 defining a maximum roll angle. The guide means advantageously comprise rings 7, mounted on the support structure 5 of the aircraft, and adapted to receive the connection cable 4. The guide means advantageously comprise a tube 70, arranged on the support structure 5 of the aircraft. Two rings 7, each adapted to receive the connection cable 4, are advantageously slidably mounted on the tube 70, for example, using a slider 700, so as to define the maximum roll angle. As an alternative embodiment, the guide means can be rolling elements (for example, pulleys, rollers) for minimizing the friction with the connection cable 4.

The guide means are advantageously arranged to guide the connection cable 4 on the surface S of the cylinder 1. The system is advantageously configured to control the winding angle of the connection cable 4 on the surface S of the cylinder 1 (and therefore the transmitted power) as a function of the tensions on the connection cable 4 on either side of the cylinder 1, for example, by virtue of the capstan formula (also called Eytelwein formula) known to a person skilled in the art.

Attachment Cable(s)

Figure 14A:
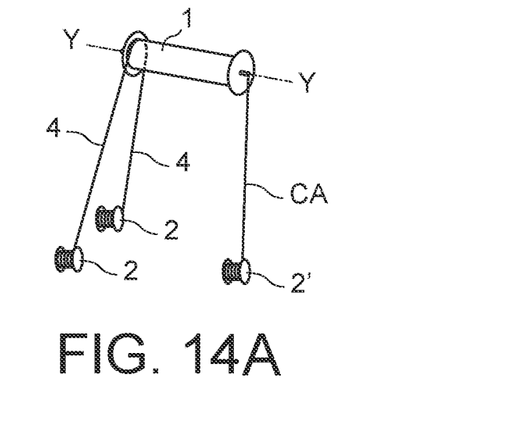
FIG. 14A is a schematic perspective view of a system according to embodiments of the disclosure, notably illustrating the presence of an attachment cable at one end of the cylinder.
Figure 14B:
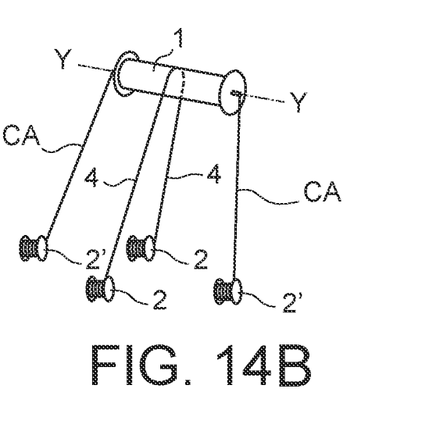
FIG. 14B is a schematic perspective view of a system according to embodiments of the disclosure, notably illustrating the presence of two attachment cables at the ends of the cylinder.

As an alternative embodiment of the guide means, the system can comprise first and/or second attachment cables CA, respectively fixed to the first and/or second longitudinal ends 10, 11 of the cylinder 1, and respectively connected to first and/or second winches 2'. As illustrated in FIG. 14A, the system comprises an attachment cable CA fixed to a longitudinal end 10, 11 of the cylinder 1. As illustrated in FIG. 14B, the system comprises two attachment cables CA each attached to a longitudinal end 10, 11 distinct from the cylinder 1.

As illustrated in FIG. 10, the system can comprise an attachment cable CA fixed to the elbow element 52 and connected to a winch 2' in order to control the pitch angle of the aircraft.

Embodiments with a Cylinder

Figure 6:
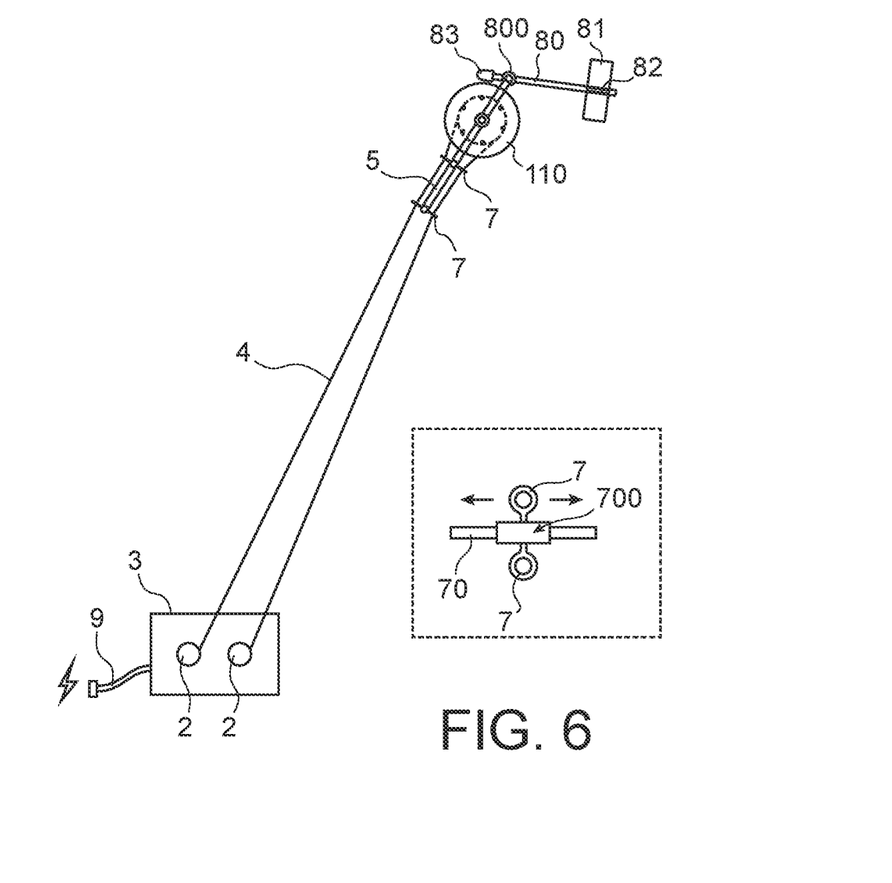
FIG. 6 is a schematic side view of a first main embodiment of a system according to the disclosure. The inset in FIG. 6 is an exploded view of an embodiment of the means for guiding the connection cable, allowing the connection cable to be guided between two positions relative to the cylinder so as to define a maximum roll angle.

According to a first embodiment, notably illustrated in FIGS. 6 and 7, the system can comprise a pair of rotatable elements 2, arranged at a distance from the aircraft;
in which system:
the drive means 3 are arranged to drive a rotational movement of the pair of rotatable elements 2; and
the connection cable 4 is arranged to connect the pair of rotatable elements 2 to the cylinder 1 of the aircraft so that the rotational movement of the pair of rotatable elements 2, driven by the drive means 3, is mechanically transmitted to the cylinder 1 of the aircraft so as to set the cylinder 1 into rotation about the longitudinal axis Y.

According to a second embodiment not illustrated, the system can comprise:
an additional pair of rotatable elements 2, arranged at a distance from the aircraft; and
an additional connection cable 4;
in which system:
the drive means 3 are arranged to drive a rotational movement of the additional pair of rotatable elements 2; and
the additional connection cable 4 is arranged to connect the additional pair of rotatable elements 2 to the cylinder 1 of the aircraft so that the rotational movement of the additional pair of rotatable elements 2, driven by the drive means 3, is mechanically transmitted to the cylinder 1 of the aircraft so as to set the cylinder 1 into rotation about the longitudinal axis Y.

Embodiments with Two Cylinders

The aircraft can comprise first and second cylinders 1, 1' respectively extending along first and second longitudinal axes Y, Y', with the first and second cylinders 1, 1' being able to rotate about the first and second longitudinal axes Y, Y', respectively.

Figure 15:
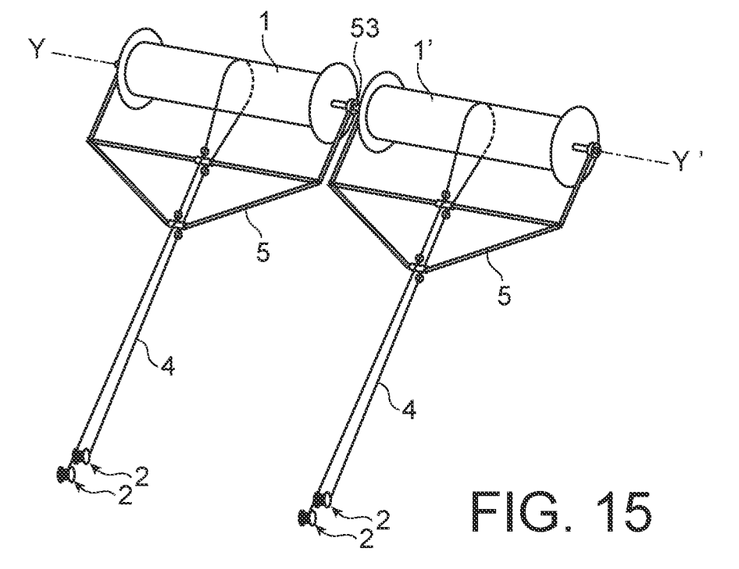
FIG. 15 is a schematic perspective view of an embodiment of a system according to the disclosure.

According to a first embodiment, notably illustrated in FIGS. 10 and 15, the system can comprise:
a pair of rotatable elements 2 and an additional pair of rotatable elements 2, arranged at a distance from the aircraft; and
a connection cable 4 and an additional connection cable 4.

The drive means 3 are arranged to drive a rotational movement of the pair of rotatable elements 2 and of the additional pair of rotatable elements 2.

The connection cable 4 is arranged to connect the pair of rotatable elements 2 to the first cylinder 1 of the aircraft so that the rotational movement of the pair of rotatable elements 2, driven by the drive means 3, is mechanically transmitted to the first cylinder 1 of the aircraft so as to set the first cylinder 1 into rotation about the first longitudinal axis Y.

The additional connection cable 4 is arranged to connect the additional pair of rotatable elements 2 to the second cylinder 1' of the aircraft so that the rotational movement of the additional pair of rotatable elements 2, driven by the drive means 3, is mechanically transmitted to the second cylinder 1' of the aircraft so as to set the second cylinder 1' into rotation about the second longitudinal axis Y'.

Figure 13:
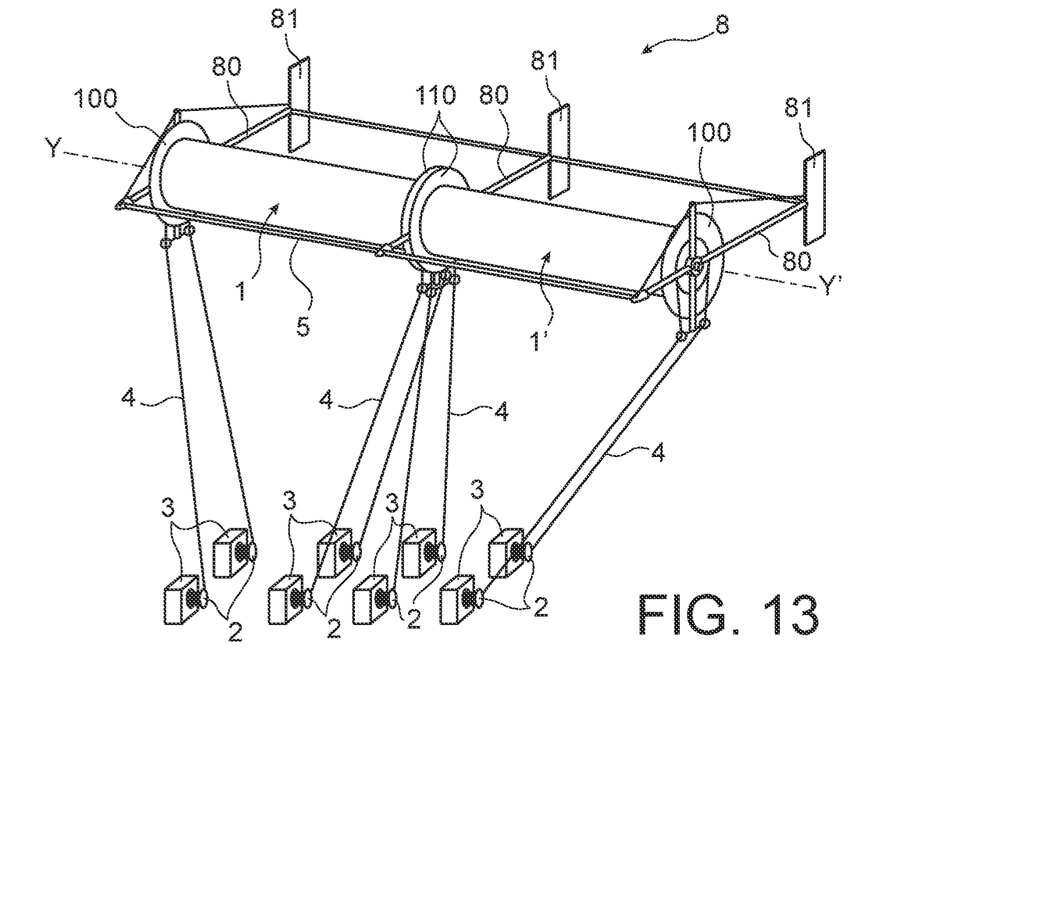
FIG. 13 is a schematic perspective view of a fourth main embodiment of a system according to the disclosure.

According to a second embodiment, notably illustrated in FIGS. 9 and 13, the system can comprise first and second assemblies, each comprising:
two pairs of rotatable elements 2, arranged at a distance from the aircraft; and
two connection cables 4;
in which system:
the drive means 3 are arranged to drive a rotational movement of the rotatable elements 2 of the first and second assemblies;
each connection cable 4 of the first assembly is arranged to connect a pair of rotatable elements 2 of the first assembly to the first cylinder 1 of the aircraft so that the rotational movement of the rotatable elements 2 of the first assembly, driven by the drive means 3, is mechanically transmitted to the first cylinder 1 of the aircraft so as to set the first cylinder 1 into rotation about the first longitudinal axis Y; and
each connection cable 4 of the second assembly is arranged to connect a pair of rotatable elements 2 of the second assembly to the second cylinder 1' of the aircraft so that the rotational movement of the rotatable elements 2 of the second assembly, driven by the drive means 3, is mechanically transmitted to the second cylinder 1' of the aircraft so as to set the second cylinder 1' into rotation about the second longitudinal axis Y'.

It is possible to contemplate the presence of more than 2 cylinders 1, 1', with each cylinder 1, 1' being connected to at least one pair of rotatable elements 2.

Tail Device

The aircraft, in lift, has a yaw axis Z, and is intended to be subjected to wind V. The system advantageously comprises a tail device 8 arranged to stabilize the aircraft along the yaw axis Z as a function of the wind V. The tail device 8 is mounted on the support structure 5 of the aircraft. More specifically, the tail device 8 can be mounted so as to be able to rotate on a longitudinal branch 50 of the support structure 5, about the first axis of the longitudinal branch 50.

The tail device 8 advantageously comprises an arm 80 extending along a longitudinal axis. The arm 80 has first and second opposite ends. The arm 80 is pivotably mounted on the longitudinal branch 50 of the structure of the support 5, around the first axis of the longitudinal branch 50, for example, by means of an articulation mechanism 800. The tail device 8 advantageously comprises a first stabilizer 81, called vertical stabilizer, extending in a first direction perpendicular to the longitudinal axis of the arm 80. When the longitudinal axis of the arm 80 is horizontal, the first direction is vertical. The first stabilizer 81 is fixed to the first end of the arm 80. The tail device 8 advantageously comprises a second stabilizer 82, called horizontal stabilizer, extending in a second direction, perpendicular to the first direction and to the longitudinal axis of the arm 80. When the longitudinal axis of the arm 80 is horizontal, the second direction is horizontal. The second stabilizer 82 is fixed to the first end of the arm 80. The second stabilizer 82 allows passive alignment of the tail device 8 with the apparent wind V in order to maximize the stabilizing effect of the first stabilizer 81.

Figure 17A:
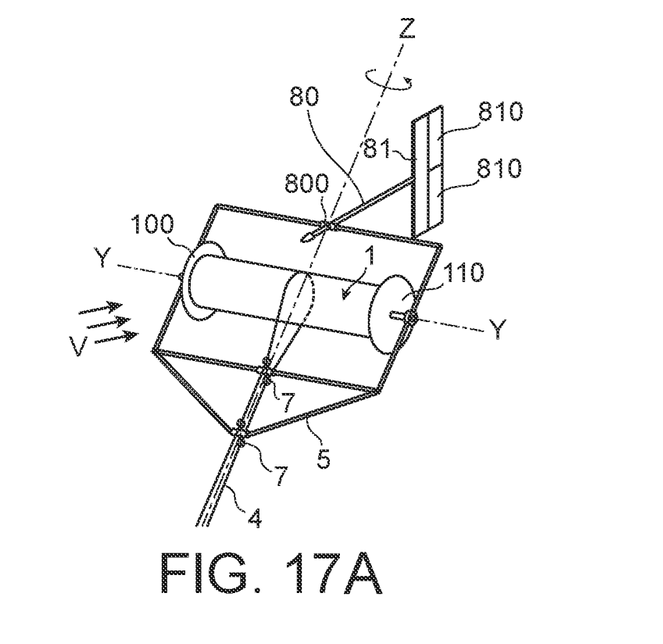
FIG. 17A is a partial schematic perspective view of a system according to embodiments of the disclosure, illustrating a position of the tail device during a power generation phase.
Figure 17B:
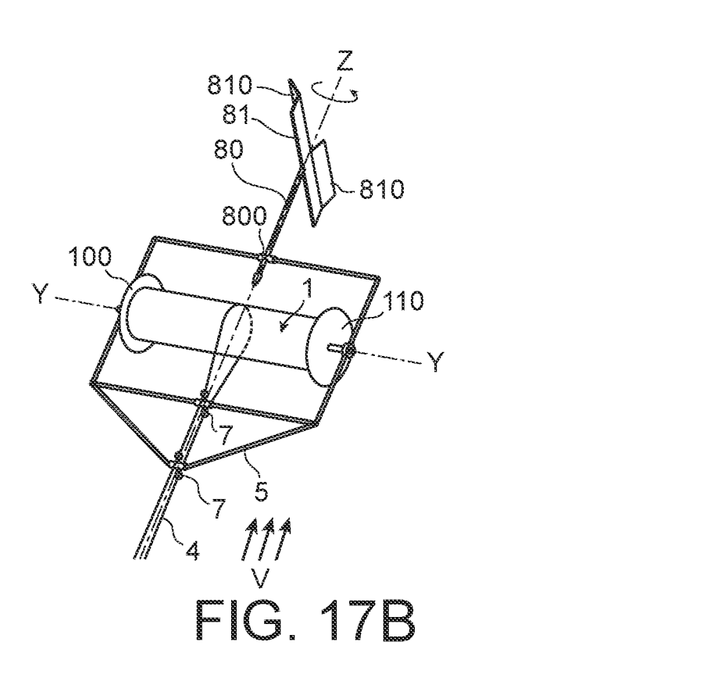
FIG. 17B is a partial schematic perspective view of a system according to embodiments of the disclosure, illustrating a position of the tail device during a phase of rewinding the connection cable.

The first stabilizer 81 advantageously comprises two independent control surfaces 810, pivotably mounted around the first direction along which the first stabilizer 81 extends. As illustrated in FIGS. 17A and 17B, the pivot angle of the two control surfaces 810 relative to the first direction of the first stabilizer 81 is adapted to the wind direction V so as to generate a kinetic moment about the yaw axis Z. The position of the longitudinal axis of the arm 80 is parallel to the wind direction V.

As illustrated in FIGS. 6 and 7, the tail device 8 advantageously comprises a sensor module 83, mounted on the second end of the arm 80. By way of a non-limiting example, the sensor module 83 can be adapted to measure the direction and the speed of the wind V, the position, the altitude, the speed and the acceleration of the aircraft. As an alternative embodiment, as illustrated in FIG. 9, the sensor module 83 can be mounted on the support structure 5 of the aircraft.

Application to Energy Conversion

The connection cable 4 is advantageously arranged to connect the aircraft to the rotatable element 2 so that a lift movement of the aircraft can be mechanically transmitted to the rotatable element 2.

The system advantageously comprises a converter, arranged to convert a rotation of the rotatable element 2, obtained by mechanical transmission of the lift movement of the aircraft, into energy.

According to one embodiment, the converter can comprise an electric generator arranged to convert a rotation of the rotatable element into electrical energy. When the rotatable element 2 is a drum of a winch, the drive means 3 consumes energy in order to wind-in the connection cable 4, while the lift movements of the aircraft allow the connection cable 4 to be unwound and electrical energy to be recovered. The electrical generator, which is arranged in the station, for example, can be electrically connected to an electrical network RE (illustrated in FIG. 9) or an energy storage system via electrical interconnection means 9. The electrical network RE can power the station, in particular the drive means 3, via the electrical interconnection means 9.

Figure 16:
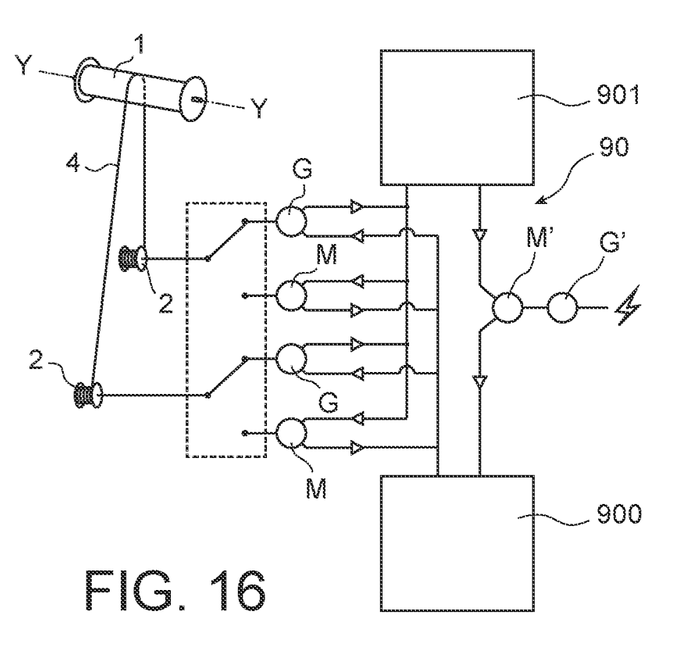
FIG. 16 is a schematic view notably illustrating means for converting a rotation of rotatable elements into energy, obtained by mechanical transmission of the lift movement of the aircraft.

According to an embodiment illustrated in FIG. 16, each rotatable element 2 is connected to a mechanical transmission TM. The mechanical transmission TM has:

a first position, in which the mechanical transmission TM is connected to a hydraulic (or pneumatic) generator G such as a pump; or a second position, in which the mechanical transmission TM is connected to a hydraulic (or pneumatic) motor M.

The hydraulic/pneumatic generators G belong to a hydraulic/pneumatic circuit 90 comprising a low-pressure tank 900 and a high-pressure tank 901. The hydraulic/pneumatic generators G pump the fluid (for example, oil or compressed air) of the hydraulic/pneumatic circuit 90 from the low-pressure tank 900 (for example, the atmosphere for a pneumatic circuit 90) to the high-pressure tank 901. The energy is therefore stored by the pressure of the fluid in the high-pressure tank 901.

When the connection cable 4 must be rewound, the mechanical transmission TM switches from the first position to the second position. The energy is consumed by the flow of fluid from the high-pressure tank 901 to the low-pressure tank 900.

In order to produce electricity, the hydraulic/pneumatic circuit 90 is connected to an additional hydraulic/pneumatic motor M' that runs an electric generator G'. Therefore, electricity production can be smoothed via this temporary storage system (of the order of a few hours), or electricity production can be adapted according to the requirements of the demand for electricity consumption.

The invention is not limited to the disclosed embodiments. A person skilled in the art is able to consider their technically operative combinations, and to replace them with equivalents.

The invention claimed is:

1. A remote control system for an aircraft, comprising:
   an aircraft, of the Magnus-effect type, comprising a cylinder extending along a longitudinal axis, the cylinder being able to rotate about the longitudinal axis;
   a pair of rotatable elements, arranged at a distance from the aircraft;
   a drive, arranged to drive a rotational movement of the pair of rotatable elements; and
   a connection cable, arranged to connect the pair of rotatable elements to the cylinder of the aircraft so that the rotational movement of the pair of rotatable elements, driven by the drive, is mechanically transmitted to the cylinder of the aircraft so as to set the cylinder into rotation about the longitudinal axis.

2. The remote control system of claim 1, wherein the connection cable is wound around the cylinder of the aircraft so that the rotational movement of the pair of rotatable elements, driven by the drive, is mechanically transmitted to the cylinder of the aircraft by friction on the connection cable so as to set the cylinder into rotation about the longitudinal axis.

3. The remote control system of claim 1, comprising a transmission device arranged to mechanically cooperate with the connection cable and the cylinder of the aircraft so that the rotational movement of the pair of rotatable elements, driven by the drive, is mechanically transmitted to the cylinder of the aircraft by the transmission device so as to set the cylinder into rotation about the longitudinal axis.

4. The remote control system of claim 3, wherein the transmission device comprises a configuration in which a mechanical transmission of the rotational movement of the pair of rotatable elements to the cylinder is interrupted, so that the cylinder is free to rotate about the longitudinal axis.

5. The remote control system of claim 1, wherein the aircraft, in lift, is intended to be subjected to wind, the remote control system comprising a controller configured to control the drive as a function of the wind.

6. The remote control system of claim 1, wherein the aircraft comprises a guide, arranged to guide the connection cable between two positions relative to the cylinder defining a maximum roll angle.

7. The remote control system of claim 1, wherein the cylinder has first and/or second longitudinal ends, the remote control system comprising first and/or second attachment cables, respectively fixed to the first and/or second longitudinal ends of the cylinder, and respectively connected to first and/or second winches.

8. The remote control system of claim 1, comprising:
an additional pair of rotatable elements, arranged at a distance from the aircraft; and
an additional connection cable;
wherein:
the drive is arranged to drive a rotational movement of the additional pair of rotatable elements; and
the additional connection cable is arranged to connect the additional pair of rotatable elements to the cylinder of the aircraft so that the rotational movement of the additional pair of rotatable elements, driven by the drive, is mechanically transmitted to the cylinder of the aircraft so as to set the cylinder into rotation about the longitudinal axis.

9. The remote control system of claim 8, wherein:
the aircraft comprises first and second cylinders respectively extending along first and second longitudinal axes, with the first and second cylinders being able to rotate about the first and second longitudinal axes, respectively;
the connection cable is arranged to connect the pair of rotatable elements to the first cylinder of the aircraft so that the rotational movement of the pair of rotatable elements, driven by the drive, is mechanically transmitted to the first cylinder of the aircraft so as to set the first cylinder into rotation about the first longitudinal axis; and
the additional connection cable is arranged to connect the additional pair of rotatable elements to the second cylinder of the aircraft so that the rotational movement of the additional pair of rotatable elements, driven by the drive, is mechanically transmitted to the second cylinder of the aircraft so as to set the second cylinder into rotation about the second longitudinal axis.

10. The remote control system of claim 9, wherein the aircraft, in lift, has a yaw axis and is intended to be subjected to wind, the remote control system comprising an elbow element having:
a first branch, connected to the first cylinder; and
a second branch, connected to the second cylinder;
with the first and second branches forming a sweep angle adapted to stabilize the aircraft along the yaw axis as a function of the wind.

11. The remote control system of claim 1, comprising first and second assemblies, each comprising:
two pairs of rotatable elements arranged at a distance from the aircraft; and
two connection cables;
wherein:
the aircraft comprises first and second cylinders respectively extending along first and second longitudinal axes, with the first and second cylinders being able to rotate about the first and second longitudinal axes, respectively;
the drive is arranged to drive a rotational movement of the rotatable elements of the first and second assemblies;
each connection cable of the first assembly is arranged to connect a pair of rotatable elements of the first assembly to the first cylinder of the aircraft so that the rotational movement of the rotatable elements of the first assembly, driven by the drive, is mechanically transmitted to the first cylinder of the aircraft so as to set the first cylinder into rotation about the first longitudinal axis; and
each connection cable of the second assembly is arranged to connect a pair of rotatable elements of the second assembly to the second cylinder of the aircraft so that the rotational movement of the rotatable elements of the second assembly, driven by the drive, is mechanically transmitted to the second cylinder of the aircraft so as to set the second cylinder into rotation about the second longitudinal axis.

12. The remote control system of claim 1, wherein the pair of rotatable elements comprises-element a drum of a winch.

13. The remote control system of claim 1, wherein the connection cable is arranged to connect the aircraft to the pair of rotatable elements so that a lift movement of the aircraft can be mechanically transmitted to the rotatable elements.

14. The remote control system of claim 13, comprising a converter, arranged to convert a rotation of the pair of rotatable elements, obtained by a mechanical transmission of the lift movement of the aircraft, into energy.

15. The remote control system of claim 1, wherein the aircraft, in lift, has a yaw axis, and is intended to be subjected to wind, the remote control system comprising a tail device, arranged to stabilize the aircraft along the yaw axis as a function of the wind.

* * * * *